United States Patent [19]

Walsh et al.

[11] Patent Number: 4,706,910
[45] Date of Patent: Nov. 17, 1987

[54] COMBINED RIBLET AND LEBU DRAG REDUCTION SYSTEM

[75] Inventors: Michael J. Walsh, Newport News; John B. Anders, Yorktown; Jerry N. Hefner, Newport News, all of Va.

[73] Assignee: The United States of America as represented by the Administrator of the National Aeronautics and Space Administration, Washington, D.C.

[21] Appl. No.: 686,959

[22] Filed: Dec. 27, 1984

[51] Int. Cl.$^4$ .............................................. B64C 21/10
[52] U.S. Cl. .................................... 244/130; 244/200; 244/199; 114/67 R; 296/1 S; 138/38
[58] Field of Search ............... 244/198, 199, 200, 204, 244/213; 138/37, 38; 416/235, 236; 114/67 R, 67 A; 296/1 S

[56] References Cited

U.S. PATENT DOCUMENTS

| | | | |
|---|---|---|---|
| 1,152,426 | 9/1915 | McCarroll | 244/200 |
| 2,573,834 | 11/1951 | Davidson | 244/130 |
| 2,650,752 | 9/1953 | Hoadley | 244/199 |
| 3,588,005 | 6/1971 | Rethorst | 244/200 |
| 4,044,797 | 8/1977 | Fujie et al. | 138/37 |
| 4,334,658 | 6/1982 | MacKenzie . | |
| 4,354,648 | 10/1982 | Schenk et al. . | |

FOREIGN PATENT DOCUMENTS

| | | | |
|---|---|---|---|
| 1036691 | 9/1953 | France | 244/130 |
| 714849 | 9/1954 | United Kingdom | 244/130 |
| 2107426 | 4/1983 | United Kingdom | 244/204 |

OTHER PUBLICATIONS

NASA Tech Brief, vol. 5, No. 2, "Grooves Reduce Aircraft Drag", 1980.

Primary Examiner—Galen Barefoot
Attorney, Agent, or Firm—George F. Helfrich; John R. Manning

[57] ABSTRACT

The invention is a system of flow control devices which result in reduced skin friction on aerodynamic and hydrodynamic surfaces. The devices cause a breakup of large-scale disturbances in the boundary layer of the flow field. Referring to FIGS. 1 and 2, the riblet device 10 acts to reduce disturbances near the boundary layer wall by the use of longitudinal striations forming vee-shaped grooves. These grooves are dimensional on the order of the wall vortices and turbulent burst dimensions 31 depicted in FIG. 3. The large-eddy breakup device 41, depicted in FIGS. 4 and 5, is a small strip or airfoil which is suspended in the upper region of the boundary layer. Various physical mechanisms cause a disruption of the large-scale vortices. The combination of the devices of this invention result in a substantial reduction in skin friction drag.

12 Claims, 11 Drawing Figures

WITH CONTROL (LOW DRAG)

TURBULENCE CONTROL

WITHOUT CONTROL (HIGH DRAG)

COMBINED RIBLET AND LEBU DRAG REDUCTION SYSTEM

ORIGIN OF THE INVENTION

The invention described herein was made by employees of the United States Government and may be used by or for the Government for governmental purposes without the payment of any royalties thereon or therefor.

TECHNICAL FIELD OF THE INVENTION

The invention is related to aerodynamic flow technology.

BACKGROUND OF THE INVENTION

This invention relates to turbulent boundary layer flow control devices and more particularly to microgeometry changes, that is riblets or longitudinal surface striations, of the wall forming the inner region of the boundary layer and ribbon-like strips, that is large-eddy breakup devices or turbulence manipulators, near the outer edge of the boundary layer which decrease boundary layer turbulence and skin-friction drag.

Various types of devices have been used for flow control over aerodynamic surfaces. These devices serve generally two purposes, either to generate separated flow, or to prevent separation. Boundary layer separation may be prevented by generating vortices in the flow thereby energizing the boundary layer or by blowing or sucking on the boundary layer.

Examples of the first type are spoilers and leading edge strips, such as installed on the Cessna T-37 aircraft and on the Lockheed T-33 aircraft. These devices affect the entire flow field creating macro effects around a section of the wing, usually near the root. These devices provide early stall warning and, in some cases, improved spin recovery characteristics.

The function of the strip or spoiler device is to disrupt either a laminar or turbulent flow sufficiently to cause separation of the flow from the surface. The resulting effect is that drag is greatly increased. This penalty is a side effect necessary to gain the aircraft stability or flight characteristic improvements. Devices of this type are unlike the present invention in that the alteration of the flow field is macro, affecting the entire region around the flow surface, while the present invention is micro in effect, creating changes only within the boundary layer.

In addition, the strip and spoiler devices cause additional turbulence and flow separation resulting in additional drag. By contrast, the present invention reduces turbulence and reduces drag.

A separation control device is the vortex generator, typically used to energize the boundary layer. By this method, high speed air is rolled into the stagnant regions of the boundary layer adding velocity to those regions so that flow separation is delayed. These devices are commonly found on the upper surface of wings just ahead of flaps or other controls where the large turning angles of the flow tend to cause separation.

The function of the vortex generator is to energize the boundary layer and thereby increase its resistance to separation. This increased resistance to separation results in an increase in skin friction drag. The vortex generator has the opposite effect compared to the present invention which reduces boundary layer turbulence and skin friction drag.

Other means of boundary layer separation control are blowing and sucking on the boundary layer in regions susceptible to separation. These methods involve either blowing high energy air into the boundary layer, typically blownflaps, such as used on the McDonnell Douglas Phantom, or sucking off the low speed inner region of the boundary layer. Both of these methods result in higher speed fluid or higher energy levels in the boundary layer where separation would normally occur. The blowing method results in increased turbulence and additional skin friction drag. Blowing is similar in function and result to the vortex generator. The suction method reduces turbulence levels but the suction drag increase causes a net drag increase. Unlike the present invention both the blowing and sucking methods are separation control methods, not skin friction reduction methods.

Accordingly, it is an object of the present invention to provide a means of reducing turbulent boundary layer skin friction drag which will be independent of mechanical power sources and will provide a high degree of reliability.

It is a further object of the present invention to provide flow control within the boundary layer which will reduce turbulence.

Another object of the invention is to control the large scale turbulent eddies in the turbulent boundary layer.

Still another object of the present invention is to reduce aerodynamic noise created by boundary layer turbulence such that a saving in insulation weight can be achieved.

Yet another object of the invention is to reduce pressure fluctuations on the surface thereby reducing fatigue and allowing lighter structures.

A further object of the present invention is to control boundary layer flow by riblet geometry on the flow surface and by large-eddy breakup devices in the outer boundary layer.

STATEMENT OF THE INVENTION

These and other objects of the invention are achieved by modifications of the flow surface micro-geometry and by flow control of the outer boundary layer using ribbon-like airfoils immersed in the outer edge of the boundary layer. Fluid flow over any surface begins with a laminar flow region which transitions to turbulence flow as the length of the surface is increased. The region of turbulent flow results in greatly increased skin friction drag. This region is also characterized by pressure which result in additional noise and vibration.

Experimental data indicate that the turbulent boundary layer consists of at least three disparate types and scales of motion. Large eddies with scales on the order of the boundary layer thickness exist in the outer region and comprise the vortical/non-vortical interface of the boundary layer with the inviscid freestream flow. Intermediate scales of motion (on the order of 150 wall units) appear throughout the layer and evidently allow for more efficient interchange between the small scale motions, that is small longitudinal vortices, which dominate the inner wall region.

Reduction of the skin friction in a turbulent boundary layer requires a modification in the outer large scale structure, the inner wall structure, or an interruption in the communication process between the inner and outer boundary layer structures. The present invention works on all three by the following proposed mechanisms: (1) restriction of the vertical velocity components by the horizontal elements of the large-eddy breakup devices: (2) suppression of the large scales due to the unsteady circulation around the elements of the large-eddy breakup devices similar to the unwinding of the large-scale vortices: (3) transfer and redistribution of energy from the turbulence to the mean flow: (4) the wake of the large eddy breakup device shields the lower boundary layer from the large scale vorticity above it; and (5) the inner wall region of the boundary layer is placed in a highly viscous region created by the transverse velocity gradient over the riblet surface.

In the preferred embodiment of the present invention, minimum drag configuration is set up on an aircraft to correspond to cruise flight conditions. Laminar flow regions around the aircraft nose, the forward positions of the wings, stabilizers, fins, engine cowlings, and remain as conventional smooth surface. All other surfaces exposed to the airstream and having turbulent attached flows are covered with riblet material having longitudinal grooves aligned with the direction of air flow. Beginning downstream from the beginning of riblet material, at a point where the turbulent boundary layer reaches a thickness of approximately 1.0 to 1.5 centimeters, a large-eddy breakup device is suspended above and parallel to the surface. Thereafter, a large-eddy breakup device is placed in tandem every 100–120 boundary layer thickness downstream.

Air flow transversing the length of the aircraft, first experiences laminar flow, then transitions to turbulent flow upon reaching the riblet material, which aids in stabilizing oscillatory motion, and farther downstream is further stabilized by large-eddy breakup devices.

BRIEF DESCRIPTION OF THE DRAWINGS

A more complete appreciation of the present invention and the many inherent advantages thereof will be readily apparent by reference to the following descriptions considered in connection with the accompanying drawings wherein.

DETAILED DESCRIPTION OF THE INVENTION

Figure 1:
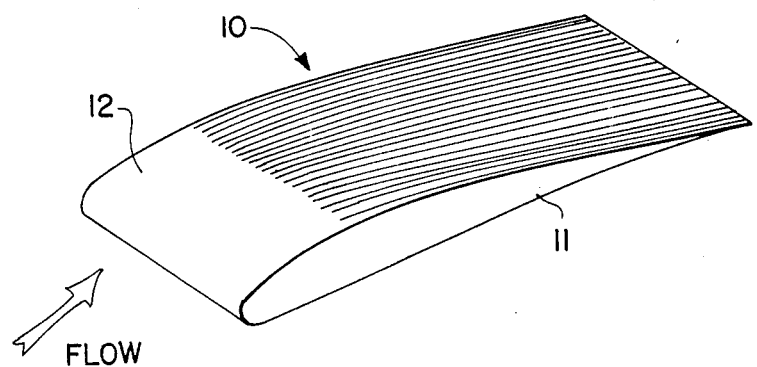
FIG. 1 is an oblique section of a wing depicting the laminar and turbulent regions on the upper surface and the location of riblet material according to the present invention.

Referring now to the drawings wherein like elements are referred to by the same reference numeral throughout the several views and more particularly to FIG. 1, there is shown the embodiment of the riblet part of the skin-friction drag reduction system according to the present invention and generally designated by the reference numeral 10. Riblet 10 in this embodiment is a sheet of vinyl tape extruded to form the grooved surface. The riblet sheet is installed over the part of aircraft wing 11 where the boundary layer flow is turbulent as determined by the cruise condition Reynolds number. The part of the wing surface 12 ahead of the riblet 10 is the region of laminar flow.

Figure 2:
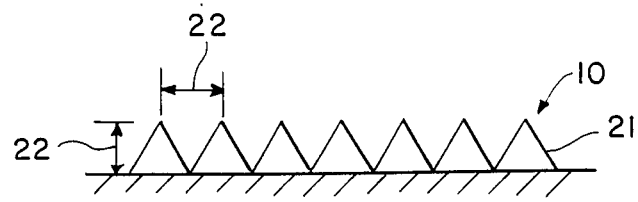
FIG. 2 is a front-end view of the riblet material detailing the shape and dimensions of the riblet material.

Specific design parameters of riblet 10 are shown in FIG. 2. Riblet 10 as viewed from a frontal cross-section is formed by grooving the vinyl tape 21 so that a series of longitudinal grooves are formed having approximately equal width and height dimensions. The actual size of the riblet dimensions over the useful range of Reynolds numbers lies between 0.1 and 0.5 millimeters.

Figure 3:
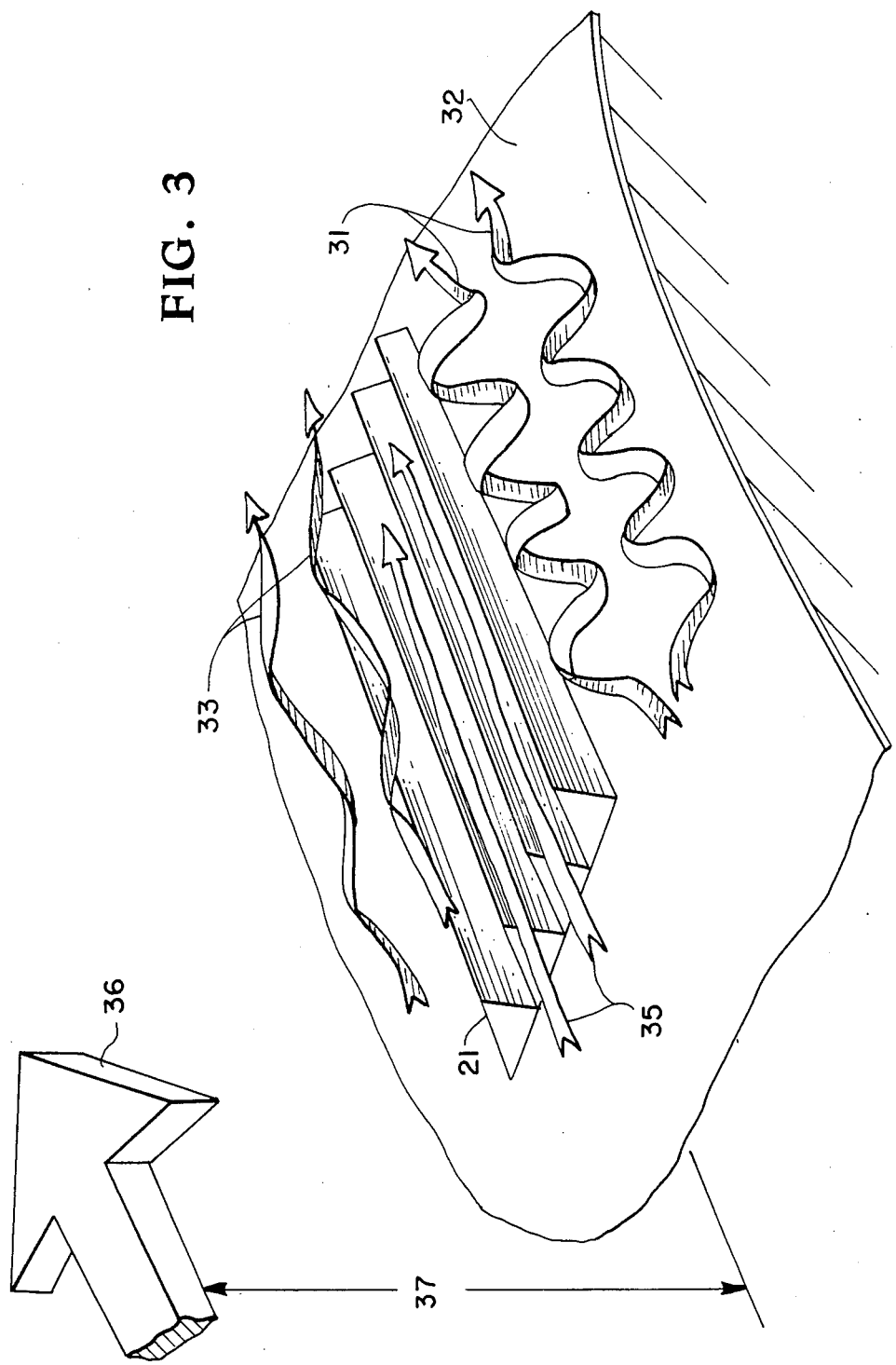
FIG. 3 is a blow-up of an oblique view of the riblet devices illustrating the turbulence damping-mechanism.

Referring now to FIG. 3, counter-rotating vortices 31 are depicted flowing over wing surface 32 without the riblet device. The growth, oscillation, and breakup of these vortices are the main factors contributing to skin friction drag of the turbulent boundary layer. For comparison, counter-rotating vortices 33 are depicted flowing over the riblet surface 21 of the present invention. A high viscous region 35 near the surface reduces turbulence levels and the associated skin friction. Riblet groove dimensions are sized on the order of these wall vortices.

Figure 4:
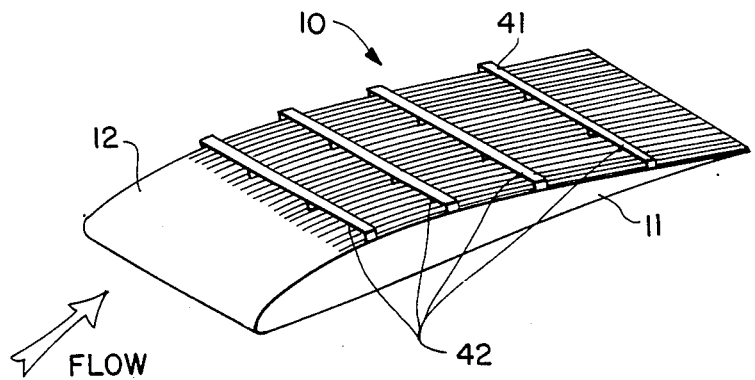
FIG. 4 is an oblique section of a wing depicting the placement of large-eddy breakup devices.
Figure 5:
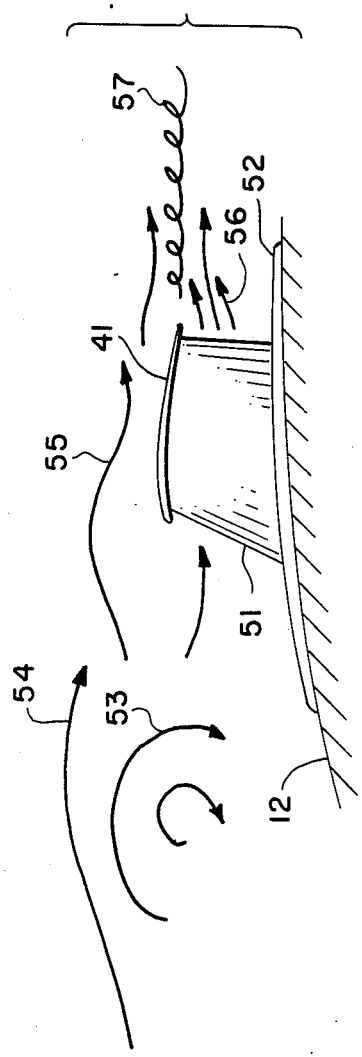
FIG. 5 is a blow-up side view of the large-eddy breakup structure detailing the dimensions and height placement.
Figure 7:
FIG. 7 is a drawing of a photograph taken of the boundary layer flow conditions with the large-eddy breakup device in place.

Further reduction of large-scale turbulence is obtained by the large-eddy breakup devices of the present invention. Referring to FIG. 4, these devices are small airfoils or flat ribbons 41 suspended parallel to and extending spanwise across the flow surface 12. Large-eddy breakups devices 41 are repeated in tandem-mountings at intervals, designated by reference numeral 42, of 100 to 120 boundary layer thickness downstream. Operation of the large-eddy breakup device 41 may be visualized by reference to FIG. 5. Large-eddy breakup device 41 is supported above and parallel to the flow surface 12 by support bracket 51 bonded to riblet surface 52. Support bracket 51 is 0.050 millimeters in thickness and extends outward from flow surface 12 to a distance equal to 50 to 80 percent of the boundary layer thickness. Representative actual values for the highest dimension lie in the range of 0.75 to 1.50 centimeters. The dimensions of the large-eddy breakup device, or ribbon-strip are approximately 0.035 millimeters in thickness, chordlength equal to the boundary layer thickness, and span extending in segments across the flow field. Flow line 53 depicts the onset of turbulent flow and the development of large-scale vertical velocity components 54 comprising the large unsteady eddies within the boundary in the absence of the present invention. Flow line 54 depicts the effects of the present invention on the large-scale eddies. The large scale effect of the device 41 sets up an opposing circulation 55 which tends to unwind the large scale eddies within the boundary layer. The device 41 also presents a physical restriction to vertical components in the large-scale eddies, depicted by the deflection of the flow line at point 56. Further prevention of large scale eddies is achieved by the device wake 57 which creates "hairpin" vortices which cut through the large scale structures. The operation of the present invention can either prevent the formation of large scale eddies or eliminate already formed eddies.

Figure 6:
FIG. 6 is a drawing of a photograph taken of boundary layer flow conditions without the use of the large-eddy breakup device.
Figure 8:
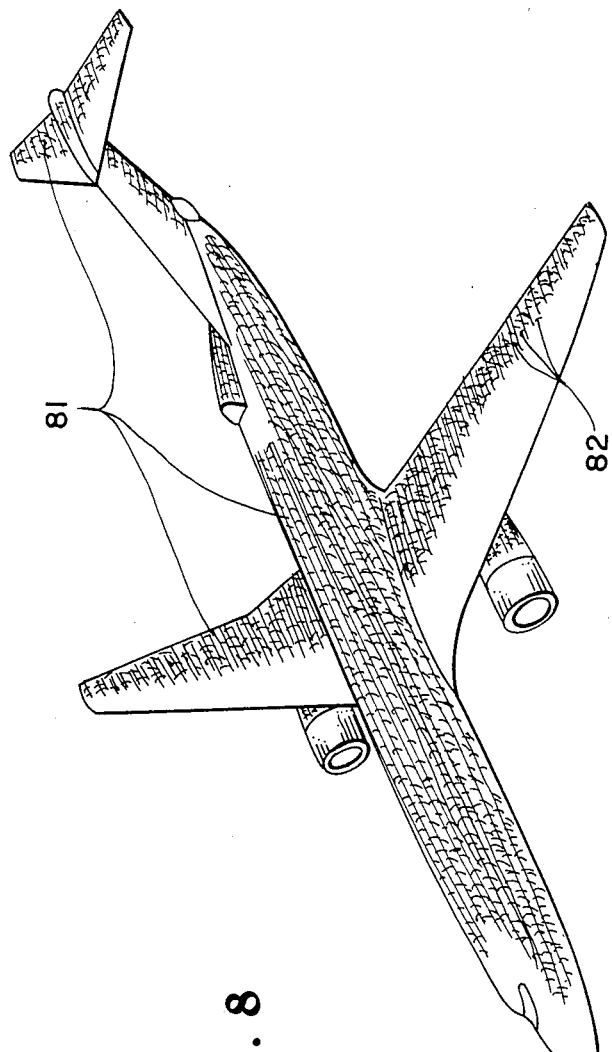
FIG. 8 is a perspective view of the preferred embodiment of the present invention as applied to a transport aircraft.

The viscous shearing forces of the boundary layer are created primarily by large scale boundary layer disturbances. The viscous forces constitute a major portion of the drag experienced by an aircraft in subsonic flight. A ten percent reduction in these forces translates into a $350 million/year fuel savings for the U.S. airline fleet. Referring to FIG. 6, the overall embodiment of the present invention to achieve these savings is shown. The riblet regions 61 are depicted by the longitudinal shaded areas and the large-eddy breakup device placements, by the spanwise dashes 62. All surfaces on the aircraft where turbulent flow exists are modified according to the present invention.

Figure 9:
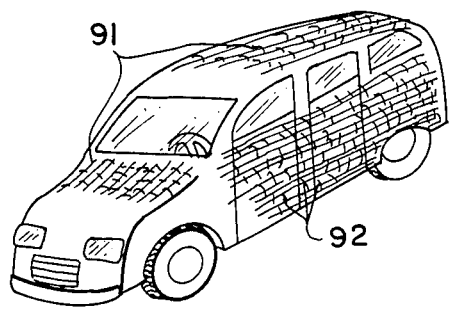
FIG. 9 embodiment of the present invention as applied to a truck body.
Figure 10:
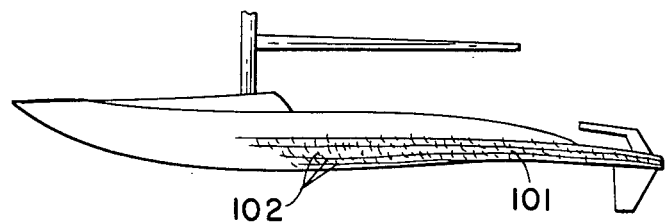
FIG. 10 is an embodiment of the present invention as applied to a boat hull.
Figure 11:
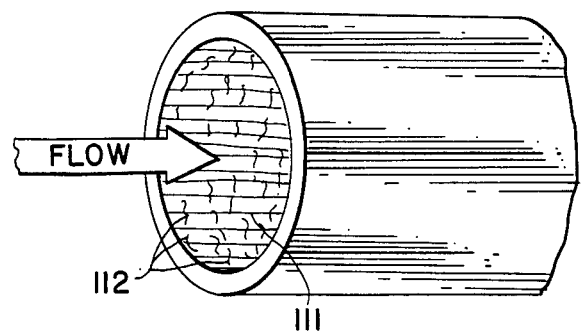
FIG. 11 depicts the present invention as installed in a pipe to reduce pumping losses.

Although the specific embodiments of the invention have been described herein, they are considered exemplary of the novel features thereof and not exhaustive. There are obviously many variations and applications of the present invention that will be readily apparent to those skilled in the art in light of the above teachings without departing from the spirit and scope of the appended claims. The present invention is specifically applicable to any turbulent flow condition where there is interaction with a physical surface, including ground vehicle surfaces as shown in FIG. 9, pipe flow as shown in FIG. 10, and marine applications as shown in FIG. 11. It is therefore understood that the invention may be practiced otherwise than specifically described.

What is claimed as new and desired to be secured by Letters Patent of the United States is:

1. A combination of devices to reduce skin friction drag by controlling the flow characteristics of a turbulent boundary layer, such that both vertical and horizontal oscillations in the flow are damped, resulting in a substantial reduction in aerodynamic noise and retarded pressure fluctuations that lead to flutter modes, comprising:
   a flow surface with an attached turbulent boundary layer;
   riblet means on said flow surface;
   large-eddy break-up means suspended above, parallel to, and spanwise across the flow surface within the outer edge of the boundary layer and;
   means for suspending said large-eddy break-up means within the outer edge of the boundary layer.

2. A combination of devices to reduce skin friction drag as in claim 1 wherein the riblet means consists of micro-geometry longitudinal grooving of the flow surface having groove depth and spacing dimensions on the order of the wall vortices dimensions.

3. A combination of devices to reduce skin friction drag as in claim 1 wherein the large-eddy break-up device is a ribbon strip having a chord length approximately equal to the boundary layer thickness and extending spanwise across and parallel to the surface.

4. A combination of devices to reduce skin friction drag as in claim 1 wherein the large-eddy breakup devices are flat strips with a chord length between 75 and 150 percent of the boundary layer thickness and suspended between 50 and 80 percent of boundary layer thickness above and parallel to the flow surface.

5. A combination of devices to reduce skin friction drag as in claim 1 wherein the flow surface is an aerodynamic wing.

6. A combination of devices to reduce skin friction drag as in claim 1 wherein the flow surface is an aerodynamic stabilizer.

7. A combination of devices to reduce skin friction drag as in claim 1 wherein the flow surface is an aerodynamic fin.

8. A combination of devices to reduce skin friction drag as in claim 1 wherein the flow surface is a boat hull.

9. A combination of devices to reduce skin friction drag as in claim 1 wherein the flow surface is a submarine hull.

10. A combination of devices to reduce skin friction drag as in claim 1 wherein the flow surface is an aircraft fuselage.

11. A combination of devices to reduce skin friction drag as in claim 1 wherein the flow surface is the body of a ground transportation vehicle.

12. A combination of devices to reduce skin friction drag as in claim 1 wherein the flow surface is the internal surface of a fluid flow duct.

* * * * *